US011018344B2

(12) United States Patent
Takeda et al.

(10) Patent No.: US 11,018,344 B2
(45) Date of Patent: May 25, 2021

(54) CURRENT COLLECTOR FOR ELECTRICAL STORAGE DEVICE, METHOD FOR PRODUCING THE SAME, AND COATING LIQUID USED IN SAID PRODUCTION METHOD

(71) Applicant: SHOWA DENKO K.K., Tokyo (JP)

(72) Inventors: Akifumi Takeda, Tokyo (JP); Takeshi Nakamura, Tokyo (JP); Hitoshi Yokouchi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 98 days.

(21) Appl. No.: 16/466,102

(22) PCT Filed: Sep. 10, 2018

(86) PCT No.: PCT/JP2018/033351
§ 371 (c)(1),
(2) Date: Jun. 3, 2019

(87) PCT Pub. No.: WO2020/053916
PCT Pub. Date: Mar. 19, 2020

(65) Prior Publication Data
US 2020/0403246 A1 Dec. 24, 2020

(51) Int. Cl.
*H01M 4/66* (2006.01)
*C09D 7/65* (2018.01)
(Continued)

(52) U.S. Cl.
CPC .............. *H01M 4/667* (2013.01); *C09D 7/61* (2018.01); *C09D 7/65* (2018.01); *C09D 7/67* (2018.01);
(Continued)

(58) Field of Classification Search
CPC .... H01M 4/667; H01M 4/0404; H01M 4/663; H01M 4/668; H01M 10/0525;
(Continued)

(56) References Cited

U.S. PATENT DOCUMENTS 8,771,878 B2  7/2014 Han et al.
9,385,374 B2  7/2016 Hellring et al.
(Continued)

FOREIGN PATENT DOCUMENTS

CN  105073915 A  11/2015
EP  3 358 662 A1  8/2018
(Continued)

OTHER PUBLICATIONS

Communication dated Aug. 10, 2020, from the European Patent Office in Application No. 18877289.1.
(Continued)

*Primary Examiner* — Gary D Harris
(74) *Attorney, Agent, or Firm* — Sughrue Mion, PLLC

(57) ABSTRACT

A current collector for electrical storage device includes a sheet-shaped conductive substrate and a coating layer disposed on one or both sides of the conductive substrate. The coating layer includes a powdery carbon material, acid-modified polyvinylidene fluoride and polyvinylpyrrolidone. The content of the polyvinylpyrrolidone is 0.099 to 5.0 mass %. The content of the powdery carbon material in the coating layer is 15.0 to 45.0 mass %. Also disclosed is a coating liquid for producing the current collector for electrical storage device as well as a method for producing the current collector for electrical storage device.

13 Claims, 4 Drawing Sheets

(51) Int. Cl.

| | | |
|---|---|---|
| *C09D 7/61* | (2018.01) | |
| *C09D 7/40* | (2018.01) | |
| *C09D 127/22* | (2006.01) | |
| *H01G 11/06* | (2013.01) | |
| *H01G 11/68* | (2013.01) | |
| *H01G 11/84* | (2013.01) | |
| *H01M 4/04* | (2006.01) | |
| *H01M 10/0525* | (2010.01) | |
| *H01M 4/02* | (2006.01) | |

(52) U.S. Cl.
CPC ........... *C09D 127/22* (2013.01); *H01G 11/06* (2013.01); *H01G 11/68* (2013.01); *H01G 11/84* (2013.01); *H01M 4/0404* (2013.01); *H01M 4/663* (2013.01); *H01M 4/668* (2013.01); *H01M 10/0525* (2013.01); *H01M 2004/021* (2013.01)

(58) Field of Classification Search
CPC .. H01M 2004/021; H01M 4/66; H01M 4/139; H01M 4/62; H01M 4/623; H01M 4/625; H01M 4/70; H01M 4/64; H01M 10/052; C09D 7/65; C09D 7/61; C09D 7/67; C09D 127/22; C09D 127/16; C09D 139/06; C09D 7/20; H01G 11/06; H01G 11/68; H01G 11/84; H01G 11/28; Y02E 60/10; C08K 3/04; B05D 1/28
USPC ........................................................ 429/234
See application file for complete search history.

(56) References Cited

U.S. PATENT DOCUMENTS

| | | |
|---|---|---|
| 9,725,606 B2 | 8/2017 | Iijima et al. |
| 9,774,038 B2 | 9/2017 | Okada et al. |
| 10,033,043 B2 | 7/2018 | Hellring et al. |
| 10,361,434 B2 | 7/2019 | Okada et al. |
| 2004/0121232 A1 | 6/2004 | Kato et al. |
| 2004/0234850 A1 | 11/2004 | Watarai et al. |
| 2005/0084758 A1 | 4/2005 | Yamamoto et al. |
| 2013/0029220 A1 | 1/2013 | Han et al. |
| 2013/0316232 A1 | 11/2013 | Iijima et al. |
| 2014/0287308 A1 | 9/2014 | Okada et al. |
| 2015/0064569 A1 | 3/2015 | Kato et al. |
| 2015/0280238 A1 | 10/2015 | Hellring et al. |
| 2016/0276673 A1 | 9/2016 | Kato et al. |
| 2016/0308216 A1 | 10/2016 | Hellring et al. |
| 2017/0226365 A1 | 8/2017 | Kobayashi et al. |
| 2017/0244105 A1 | 8/2017 | Okada et al. |
| 2017/0263925 A1* | 9/2017 | Shim .................. H01M 4/1391 |
| 2017/0271717 A1 | 9/2017 | Yamashita et al. |
| 2018/0269484 A1 | 9/2018 | Kobayashi et al. |
| 2018/0301705 A1 | 10/2018 | Hellring et al. |

FOREIGN PATENT DOCUMENTS

| | | |
|---|---|---|
| JP | 2002-134113 A | 5/2002 |
| JP | 2004-030998 A | 1/2004 |
| JP | 3982221 B2 | 9/2007 |
| JP | 2010-61996 A | 3/2010 |
| JP | 5553165 B2 | 7/2014 |
| JP | 5578370 B2 | 8/2014 |
| JP | 2015-088465 A | 5/2015 |
| JP | 2017-174809 A | 9/2017 |
| TW | 201241078 A | 10/2012 |
| TW | 201330370 A | 7/2013 |
| TW | 201612261 A | 4/2016 |
| WO | 03/100888 A1 | 12/2003 |
| WO | 2013/151046 A1 | 10/2013 |
| WO | 2018/164094 A1 | 9/2018 |

OTHER PUBLICATIONS

Written Opinion for PCT/JP2018/033351 dated Dec. 4, 2018 [PCT/ISA/237].

Communication dated Oct. 7, 2019, from the European Patent Office in counterpart European Application No. 18877289.1.

* cited by examiner

[FIG. 1]
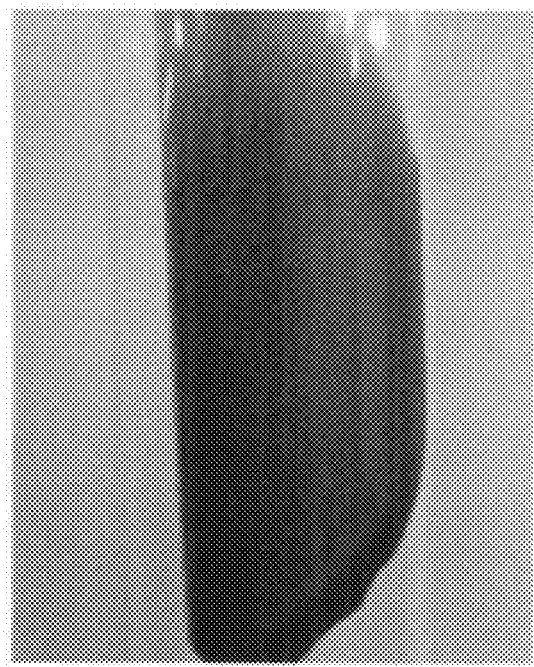
[FIG. 2]
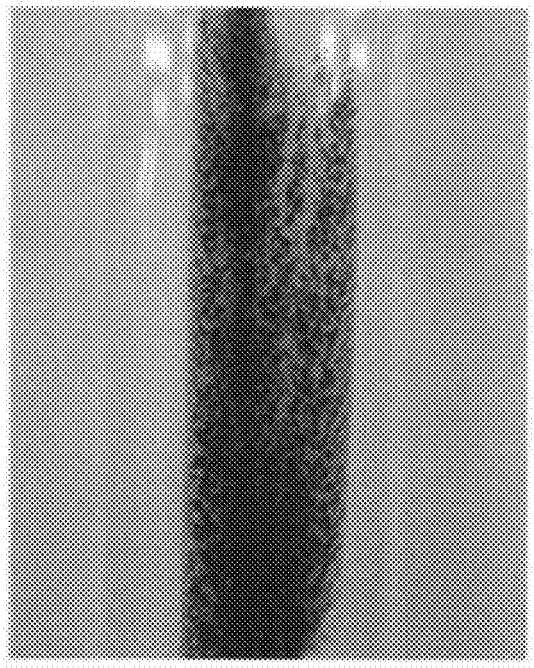

[FIG. 3]
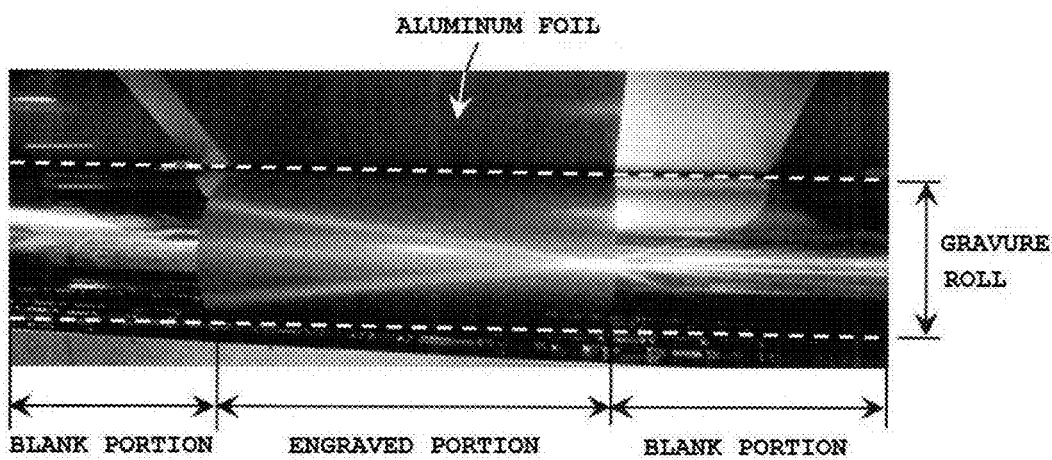
[FIG. 4]
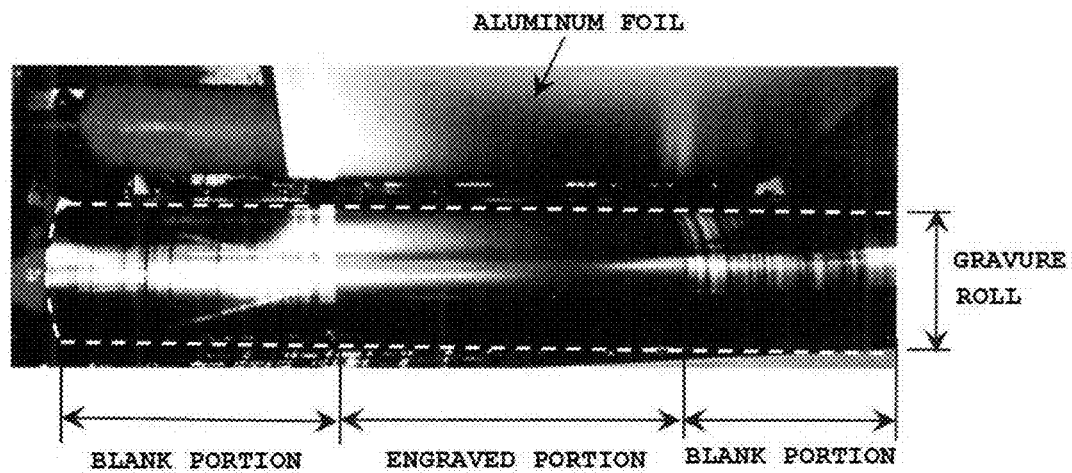

[FIG. 5]
[FIG. 6]
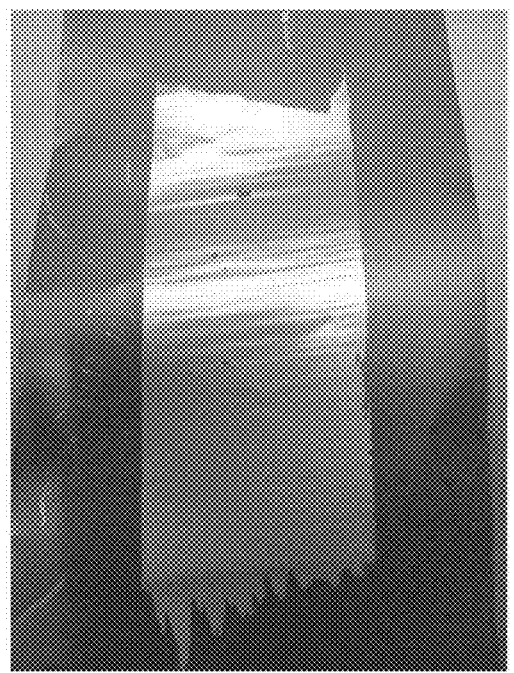

[FIG. 7]
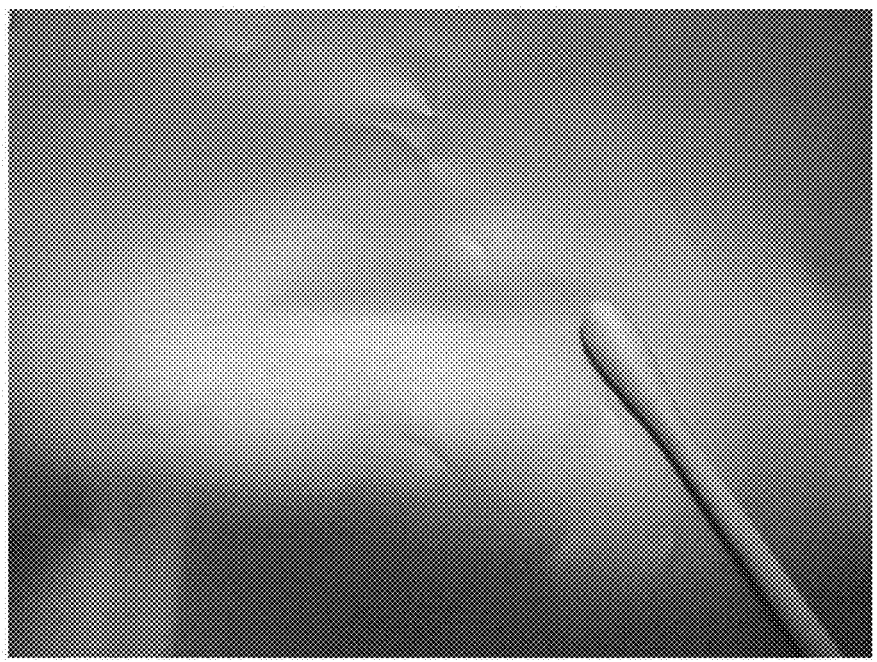
[FIG. 8]
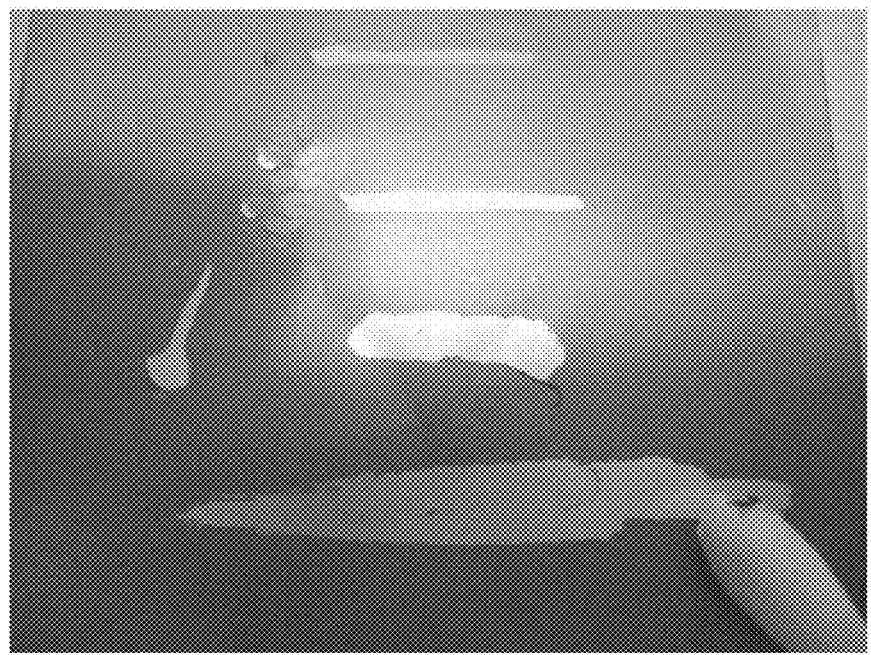

CURRENT COLLECTOR FOR ELECTRICAL STORAGE DEVICE, METHOD FOR PRODUCING THE SAME, AND COATING LIQUID USED IN SAID PRODUCTION METHOD

CROSS REFERENCE TO RELATED APPLICATIONS

This application is a National Stage of International Application No. PCT/JP2018/033351 filed Sep. 10, 2018.

TECHNICAL FIELD

The present invention relates to a current collector for electrical storage device, a method for producing such current collectors, and a coating liquid used in the production method. More particularly, the invention relates to a current collector for electrical storage device which has a metal foil and, on a surface thereof, a resin layer containing a powdery carbon material, to a method for producing such current collectors, and to a coating liquid used in the production method.

In the present invention, the term "electrical storage devices" means lithium ion secondary batteries when the invention is applied to storage batteries, and means electrical double layer capacitors and lithium ion capacitors when applied to the field of electrochemical capacitors.

BACKGROUND ART

Electrical storage devices such as lithium ion secondary batteries and electrical double layer capacitors attract high attention in recent years. From the points of view of miniaturization and weight reduction, lithium ion secondary batteries are used as power supplies in laptop computers, mobile phones, power tools, electronic communication devices and the like. Recently, lithium ion secondary batteries have found use in green vehicles such as electric vehicles and hybrid vehicles. Electrical double layer capacitors, which can store a very large amount of electric charges, are a potential replacement for batteries and capture high attention as, for example, backup power supplies, automobile idling stop systems and large-scale storage systems such as ESS. Further, redox flow batteries have a long cycle life and are being practically used as 1000 kW-grade large power systems.

Lithium ion secondary batteries and electrical double layer capacitors have some similar components, one of which is electrodes. Numerous studies are being carried out on the reduction of electrode resistance that is a challenge common to lithium ion secondary batteries and electrical double layer capacitors.

For example, a lithium ion secondary battery includes a positive electrode including a metal oxide such as lithium cobalt oxide as a positive electrode active material, a negative electrode including a carbon material such as graphite as a negative electrode active material, and an electrolytic solution including a carbonate as a solvent. The lithium ion secondary battery is charged and discharged by the migration of lithium ions between the positive electrode and the negative electrode.

The positive electrode is obtained by applying a slurry containing a positive electrode active material and a binder to a surface of a positive electrode current collector such as an aluminum foil, drying the film and cutting the plate into an appropriate size. The negative electrode is obtained by applying a slurry containing a negative electrode active material and a binder to a surface of a negative electrode current collector such as a copper foil, followed by drying and cutting the plate into an appropriate size. The slurry used in the positive electrode is generally an organic solvent-based slurry which contains polyvinylidene fluoride (PVDF), polytetrafluoroethylene (PTFE) or the like as the binder. The slurry used for the negative electrode is generally an aqueous slurry containing styrene butadiene rubber (SBR), acrylic resin or the like as the binder.

Due to the recent demands for increased capacities, high-voltage active materials are used to increase the voltage applied to electrical storage devices. For example, a positive electrode active material with a high nickel proportion is used in lithium ion secondary batteries to allow the batteries to be charged at a voltage of 4.2 V or above and thereby to realize an increased capacity. To reduce the resistance and to extend the life of electrical storage devices, electrode current collectors such as aluminum foils are coated with a mixture of carbon fine particles and a binder resin. By using such carbon-coated foils, the resistance at the interface between the electrode and the current collector is reduced, and thereby the resistance of the electrical storage device itself is lowered. However, the voltage applied at an increased magnitude will surpass the withstand voltage of binder resins (such as acrylic resins and polysaccharide resins) that are used in general carbon-coated foils, and the resins are oxidatively decomposed to cause functional deteriorations of electrical storage devices, specifically, an increase in resistance at the interface between the electrode and the current collector, and a decrease in adhesion between the electrode and the current collector. Such functional deteriorations make infeasible normal charging and discharging of electrical storage devices and adversely affect all the characteristics that are important performance indicators of secondary batteries. For example, batteries will have an increased internal resistance, a reduced capacity and a short life.

A possible approach to solving the above problems is to apply PVDF with high withstand voltage as a binder resin that is used in carbon-coated current collector foils for electrical storage devices. For example, Patent Literatures 1 to 4 describe PVDF as a binder, and electrical storage devices according to these techniques are expected to withstand a higher voltage and to attain an increased capacity.

Patent Literature 1 discloses a current collector which has a conductive resin layer on at least one side of a conductive substrate, wherein the resin layer includes a fluororesin and conductive particles and has a thickness of 0.3 to 20 µm. PVDF and acrylic acid-modified PVDF are mentioned as preferred fluororesins. According to the disclosure, these current collectors impart shutdown functions and excellent high-rate characteristics to devices such as lithium ion batteries.

Patent Literature 2 discloses that at least one of a positive electrode and a negative electrode in a nonaqueous secondary battery includes a conductive layer between a current collector and an electrode mixture layer, wherein the conductive layer includes a conductive material and PVDF as a binder and has a mass ratio ($\alpha$ crystal/$\beta$ crystal) of $\alpha$ crystal PVDF to $\beta$ crystal PVDF of 0.35 to 0.56 as determined based on a nuclear magnetic resonance spectrum. According to the disclosure, these configurations ensure that the internal resistance of the battery is elevated in the event of temperature rise such as during overcharging and thereby the battery is prevented from overheating.

Patent Literature 3 discloses that a secondary battery electrode includes an electrode active material layer, a current collector and, disposed between these components, a conductive intermediate layer containing conductive particles and a thermoplastic polymer, the thermoplastic polymer having a number average molecular weight of $6.3 \times 10^5$ to less than $1.0 \times 10^6$. PVDF is described as a preferred thermoplastic polymer. According to the disclosure, these configurations enhance the stability of the conductive intermediate layer in the secondary battery electrode, and cycle characteristics, and also ensure that the conductive intermediate layer will favorably accomplish shutdown effects.

Patent Literature 4 discloses a lithium ion polymer secondary battery that includes a positive electrode which includes a positive electrode current collector and, disposed on a surface thereof, a positive electrode active material layer containing a first binder in an active material; and a negative electrode which includes a negative electrode current collector and, disposed on a surface thereof, a negative electrode active material layer containing a second binder in an active material, the second binder being the same as or different from the first binder. This lithium ion polymer secondary battery has a first bonding layer between the positive electrode current collector and the positive electrode active material layer, and a second bonding layer between the negative electrode current collector and the negative electrode active material layer. The first and the second bonding layers each contain a third binder and a conductive substance, the third binder being a polymer compound obtained by modifying the first binder or the second binder with a modifier. PVDF is described as an example of the first binder and the second binder. According to the disclosure, the first bonding layer or the second bonding layer includes graphite, modified PVDF and 0.1 to 20 mass % dispersant. Example dispersants described therein are acidic polymeric dispersants, basic polymeric dispersants and neutral polymeric dispersants. Some advantages obtained by the above configurations are that the bonding layers achieve an enhanced adhesion between the current collector and the active material layer, are not dissolved into the electrolytic solution to offer excellent long-term storage properties and cycle characteristics, and serve as protective layers to prevent the current collectors from corrosion even in the case where corrosive substances such as hydrofluoric acid are generated within the battery.

Patent Literature 5 discloses a nonaqueous electrolyte secondary battery including a positive electrode, a negative electrode, a nonaqueous electrolyte and a separator, the positive electrode having a positive electrode mixture layer containing a positive electrode active material, and a positive electrode current collector. The positive electrode current collector is composed of a metal foil and a conductive layer containing carbon fine particles which is disposed on a surface of the metal foil. The positive electrode mixture layer is disposed on the positive electrode current collector. The positive electrode mixture layer has a porosity of 25 to 40%. According to the disclosure, the nonaqueous electrolyte secondary battery having the above configurations can be charged and discharged at a large current and exhibits good load characteristics.

CITATION LIST

Patent Literature

Patent Literature 1: WO 2013/151046
Patent Literature 2: Japanese Patent No. 5553165
Patent Literature 3: Japanese Patent No. 5578370
Patent Literature 4: Japanese Patent No. 3982221
Patent Literature 5 JP-A-2015-88465

SUMMARY OF INVENTION

Technical Problem

While PVDF is generally known as a binder used in electrodes for devices such as lithium ion secondary batteries, carbon fine particles as a conductive auxiliary show very low dispersibility when slurried with PVDF. This poor dispersibility is particularly noticeable when the particle size of carbon fine particles is small as in the case of carbon-coated foils. Such a slurry containing poorly dispersed carbon fine particles cannot be uniformly applied over a substrate, and the uneven coating disadvantageously produces areas having low conductivity. Where such a slurry is applied with a gravure printing machine to attain a thin and uniform thickness, uncoated streaks (in which the substrate is exposed in streaks) may be generated or the cells of the gravure printing plate are clogged at times. Further, a coating liquid containing carbon fine particles and PVDF exhibits low adhesion with respect to a substrate, and the coating layer comes off from the substrate during the process of forming an electrode layer. As discussed hereinabove, many problems are encountered in the appropriate application of PVDF as a binder to carbon-coated foils.

An effective solution to the above problems is to enhance dispersibility by the addition of additives such as dispersants. Doses are also important. Excessively large doses increase slurry viscosity, while dispersibility is not effectively enhanced if additives are added in too small amounts. So, careful considerations are needed for use. Patent Literature 1 does not describe any additives. Patent Literature 2 describes that optional components other than PVDF, for example, polymers other than PVDF may be added, but no details of such components are presented. Patent Literature 3 mentions that conductive particles and a thermoplastic polymer which are materials for the conductive intermediate layer are mixed together in a solvent optionally together with additives such as a dispersant and a thickener, but no reference is made to details. Although Patent Literature 4 exemplifies dispersants by listing acidic polymeric dispersants, basic polymeric dispersants and neutral polymeric dispersants, there are no specific detailed considerations made therein. In Patent Literature 5, polyvinylidene fluoride and polyvinylpyrrolidone are mentioned as a binder and a dispersant, respectively, but no specific detailed considerations are made therein.

An object of the present invention is to provide a coating liquid for producing a current collector for electrical storage device which has a carbon coating layer on one or both sides of a conductive substrate, specifically, a coating liquid that contains a powdery carbon material such as carbon fine particles dispersed in an enhanced manner. Other objects of the invention are to provide a current collector for electrical storage device which has enhanced adhesion with respect to a substrate and allows an electrical storage device to attain a low resistance, and to provide a method for producing such current collectors.

Solution to Problem

The present invention provides the following to achieve the above objects.

[1] A current collector for electrical storage device comprising a sheet-shaped conductive substrate and a coating layer disposed on one or both sides of the conductive substrate, wherein
the coating layer comprises a powdery carbon material, acid-modified polyvinylidene fluoride and polyvinylpyrrolidone,
the content of the polyvinylpyrrolidone in the coating layer is 0.099 to 5.0 mass %, and
the content of the powdery carbon material in the coating layer is 15.0 to 45.0 mass %.

[2] The current collector for electrical storage device described in [1], wherein the surface roughness Ra of the coating layer is not more than 1.0 μm.

[3] The current collector for electrical storage device described in [1] or [2], wherein the average particle size of primary particles of the powdery carbon material in the coating layer is 10 to 100 nm.

[4] The current collector for electrical storage device described in any one of [1] to [3], wherein the BET specific surface area of the powdery carbon material is not more than 100 m$^2$/g.

[5] The current collector for electrical storage device described in any one of [1] to [4], wherein the basis weight of the coating layer per side of the conductive substrate is 0.1 to 5.0 g/m$^2$.

[6] A coating liquid for producing a current collector for electrical storage device, comprising a powdery carbon material, acid-modified polyvinylidene fluoride, polyvinylpyrrolidone and a solvent,
the total content of the powdery carbon material, the acid-modified polyvinylidene fluoride and the polyvinylpyrrolidone being 2 to 20 mass % of the coating liquid,
the ratio of the powdery carbon material to the acid-modified polyvinylidene fluoride (mass of powdery carbon material:mass of acid-modified polyvinylidene fluoride) being 20:80 to 40:60,
the content of the polyvinylpyrrolidone being 0.099 to 5.0 parts by mass per 100 parts by mass of the total of the powdery carbon material and the acid-modified polyvinylidene fluoride,
the solvent comprising N-methyl-2-pyrrolidone.

[7] The coating liquid described in [6], wherein the solvent further comprises a $C_{1-6}$ alkyl alcohol.

[8] The coating liquid described in [7], which consists solely of the powdery carbon material, the acid-modified polyvinylidene fluoride, the polyvinylpyrrolidone, the alkyl alcohol and N-methyl-2-pyrrolidone.

[9] The coating liquid described in any one of [6] to [8], which has a viscosity at 25° C. of 20 to 200 mPa·s.

[10] The coating liquid described in any one of [6] to [9], wherein the average particle size of primary particles of the powdery carbon material is 10 to 100 nm.

[11] The coating liquid described in any one of [6] to [10], wherein the BET specific surface area of the powdery carbon material is not more than 100 m$^2$/g.

[12] The coating liquid described in any one of [6] to [11], wherein the powdery carbon material is carbon black, and the carbon black has an electric resistivity of not more than $3 \times 10^{-1}$ Ω·cm as measured with respect to a 100%-pressed powder compact in accordance with JIS K 1469: 2003.

[13] The coating liquid described in any one of [6] to [12], wherein the acid-modified polyvinylidene fluoride has a weight average molecular weight of $2.0 \times 10^5$ to $1.4 \times 10^6$, and the polyvinylpyrrolidone has a weight average molecular weight of $5.0 \times 10^3$ to $1.4 \times 10^6$.

[14] A method for producing a current collector for electrical storage device, comprising:
a step of preparing a coating liquid comprising a powdery carbon material, acid-modified polyvinylidene fluoride, polyvinylpyrrolidone and a solvent,
a step of applying the coating liquid to one or both sides of a sheet-shaped conductive substrate, and
a step of drying the coating liquid applied,
the total content of the powdery carbon material, the acid-modified polyvinylidene fluoride and the polyvinylpyrrolidone being 2 to 20 mass % of the coating liquid,
the ratio of the powdery carbon material to the acid-modified polyvinylidene fluoride (mass of powdery carbon material:mass of acid-modified polyvinylidene fluoride) being 20:80 to 40:60,
the content of the polyvinylpyrrolidone being 0.099 to 5.0 parts by mass per 100 parts by mass of the total of the powdery carbon material and the acid-modified polyvinylidene fluoride,
the solvent comprising N-methyl-2-pyrrolidone.

[15] The production method described in [14], wherein the step of applying the coating liquid is a gravure coating step.

[16] The production method described in [14] or [15], wherein the solvent further comprises a $C_{1-6}$ alkyl alcohol.

[17] The production method described in any one of [14] to [16], wherein the viscosity of the coating liquid at 25° C. is 20 to 200 mPa·s.

[18] The production method described in any one of [14] to [17], wherein the average particle size of primary particles of the powdery carbon material in the coating liquid is 10 to 100 nm.

[19] The production method described in any one of [14] to [18], wherein the BET specific surface area of the powdery carbon material is not more than 100 m$^2$/g.

[20] The production method described in any one of [14] to [19], wherein the powdery carbon material is carbon black, and the carbon black has an electric resistivity of not more than $1 \times 10^{-1}$ Ω·cm as measured with respect to a 100%-pressed powder compact in accordance with JIS K 1469: 2003.

Advantageous Effects of Invention

The current collector for electrical storage device of the present invention has a low resistance. The coating liquid of the invention for forming a coating layer in a current collector for electrical storage device contains a powdery carbon material dispersed in the liquid in an enhanced manner. The coating liquid of the invention can be applied uniformly so as to attain an enhanced adhesion with respect to a substrate and can realize a low-resistance electrical storage device.

The method of the invention for producing a current collector for electrical storage device can fabricate current collectors easily with a common coating technique.

BRIEF DESCRIPTION OF DRAWINGS

FIG. 1 shows the result of observation of the dispersibility of carbon black in a coating liquid produced in Example 1-1.

FIG. 2 shows the result of observation of the dispersibility of carbon black in a coating liquid produced in Comparative Example 1-1.

FIG. 3 shows the appearance of a coating liquid produced in Example 1-1, the coating liquid being gravure coated onto an aluminum foil.

FIG. 4 shows the appearance of a coating liquid produced in Comparative Example 1-1, the coating liquid being gravure coated onto an aluminum foil.

FIG. 5 shows the observation result in adhesion evaluation 1 of a coating layer formed in Example 1-1.

FIG. 6 shows the observation result in adhesion evaluation 1 of a coating layer formed in Comparative Example 5.

FIG. 7 shows the observation result in adhesion evaluation 2 of a coating layer formed in Example 1-1.

FIG. 8 shows the observation result in adhesion evaluation 2 of a coating layer formed in Comparative Example 5.

DESCRIPTION OF EMBODIMENTS

Hereinbelow, current collectors for electrical storage devices, production methods therefor, and coating liquids for producing current collectors according to the present invention will be described in detail. The requirements described below such as materials and specifications are only illustrative, and the present invention is not limited thereto and may be modified appropriately without departing from the spirit of the invention.

[Current Collectors for Electrical Storage Devices]

A current collector for electrical storage device according to the present invention includes a sheet-shaped conductive substrate and a coating layer disposed on one or both sides of the conductive substrate. The coating layer includes a powdery carbon material, acid-modified polyvinylidene fluoride and polyvinylpyrrolidone.

(Conductive Substrates)

In the current collector for electrical storage device, the sheet-shaped conductive substrate may be made of any metal material without limitation. A foil, which has excellent workability, is preferably used as the substrate. For example, in a lithium ion secondary battery, an aluminum foil may be used in the positive electrode current collector, and a copper foil may be used in the negative electrode current collector.

The material of the aluminum foil is not particularly limited. A pure aluminum foil or an aluminum alloy foil containing 95 mass % or more aluminum is preferable. Examples of the pure aluminum foils include A1085. Examples of the aluminum alloy foils include A3003 (Mn-doped material).

The material of the copper foil is not particularly limited. An electrolytic copper foil having a rustproof-treated surface is preferable. Alternatively, the substrates may be selected from those substrates used in electrical storage devices, with examples including nickel foils, titanium foils and stainless steel foils.

The thickness of the substrate is not particularly limited. From points of view such as miniaturization of electrical storage devices and handling properties, it is usually preferable that the thickness of the substrate be 3 μm to 100 μm. Where a roll-to-roll technique is adopted, a substrate with a thickness of 5 μm to 50 μm is preferably used.

Regarding the shape, the substrate may be a foil that is not perforated, or may be a perforated foil such as a two-dimensional mesh foil, a three-dimensional network foil or a punched metal foil.

The surface of the substrate may be treated by a known method. Examples of the treatment methods include surface machining, etching, chemical conversion treatment, anodization, wash primer treatment, corona discharging and glow discharging.

(Coating Layers)

On one or both sides of the sheet-shaped conductive substrate, a coating layer is disposed which includes a powdery carbon material, acid-modified polyvinylidene fluoride and polyvinylpyrrolidone.

The thickness of the coating layer is preferably 0.1 μm to 15.0 μm, more preferably 0.2 μm to 10.0 μm, and still more preferably 0.3 μm to 5.0 μm. When the thickness of the coating layer is 0.1 μm or more, the powdery carbon material advantageously ensures conduction between the conductive substrate and an electrode active material. When the thickness is 15.0 μm or less, advantages are obtained in that the increase in electric resistance due to thickness is not significantly large, and in that good productivity is obtained.

The basis weight (the coating mass per unit area) of the coating layer per side of the conductive substrate is preferably 0.1 to 5.0 $g/m^2$, and more preferably 0.2 to 3.0 $g/m^2$. When the basis weight of the coating layer is 0.1 $g/m^2$ or more, the powdery carbon material ensures conduction between the conductive substrate and an electrode active material. When the basis weight of the coating layer is 5.0 $g/m^2$ or less, advantages is obtained in that the resistance can be reduced to approximately 1/10 or below compared to when no coating layers are formed on the conductive substrate, and also in that good productivity is obtained. When, for example, the current collector of the invention is used in a lithium ion secondary battery and an aqueous slurry containing a positive electrode active material is applied thereto to fabricate an electrode, the basis weight of the coating layer is preferably not less than 0.2 $g/m^2$ to prevent the corrosion of the conductive substrate by the aqueous slurry. When the coating layers are formed on both sides of the conductive substrate, the basis weight is approximately twice the above value. The basis weight may be different between the two sides.

(Powdery Carbon Materials)

The powdery carbon material is not particularly limited as long as it can impart conductive properties to the coating layer. Some preferred powdery carbon materials are carbon fibers such as carbon nanofibers and carbon nanotubes, and carbon fine particles such as carbon blacks and graphite fine particles. Examples of the carbon blacks include acetylene black, furnace black and Ketjen black. In particular, from the point of view of the conductive properties of the coating layer, the powdery carbon material is preferably one which has an electric resistivity of not more than $3\times10^{-1}$ Ω·cm, and more preferably not more than $2\times10^{-1}$ Ω·cm as measured with respect to a 100%-pressed powder compact in accordance with JIS K 1469: 2003. Where necessary, a combination of the above carbon materials may be used. In particular, carbon blacks are preferable from the points of view of the dispersibility in the coating liquid and the adhesion of the coating layer to the substrate. Where the coating layer is formed by gravure coating, acetylene black is more preferable from the point of view of application properties.

The BET specific surface area of the powdery carbon material is preferably not more than 100 $m^2/g$, and more preferably not more than 75 $m^2/g$. When the BET specific surface area is 100 $m^2/g$ or less, the material exhibits good dispersibility in the coating liquid, and the coating liquid can form a uniform coating layer on the conductive substrate by gravure coating; further, the adhesion among the particles of the powdery carbon material, or the adhesion between the conductive substrate and the coating layer may be maintained.

In the carbon fine particles used as the powdery carbon material, the average particle size of primary particles is not particularly limited but is preferably 10 to 100 nm. The average particle size of primary particles of the carbon fine particles may be determined by measuring the primary particle sizes of 100 to 1000 carbon fine particles with an electron microscope, and calculating the arithmetic average thereof. The particle size is the circular equivalent diameter where the particles are spherical, and is the largest diameter when the particles are amorphous.

The shape of the carbon fine particles is not particularly limited. Preferably, the particles are continuously connected like prayer beads to form many conductive paths, and are uniformly dispersed over the conductive substrate. Since the electron-conductive carbon fine particles mediate the migration of electrons between the electrode active material and the substrate, the above arrangement of carbon fine particles advantageously offers a large area of contact between the coating layer and the active material. It is also preferable that there be few aggregated masses of carbon fine particles for the reason that less aggregations lead to a uniform thickness of the coating layer and allow for the designing of electrical storage devices with uniform thickness. To attain this, the surface roughness Ra which reflects the surface irregularities of the coating layer is preferably not more than 1.0 μm, more preferably not more than 0.9 μm, and still more preferably not more than 0.8 μm. The lower limit of the surface roughness Ra is preferably 0.1 μm, and more preferably 0.2 μm. When the surface roughness Ra is 0.1 μm or above, the coating layer is effectively anchored with an electrode containing a positive electrode or negative electrode active material, and thereby effectively attains a reduction in interface resistance.

The content of the powdery carbon material in the coating layer is 15.0 to 45.0 mass %, preferably 17.5 to 42.5 mass &, and more preferably 20.0 to 40.0 mass %.

When the content of the powdery carbon material in the coating layer is 15.0 mass % or above, sufficient conductive properties may be obtained. When the content of the powdery carbon material is 45.0 mass % or less, the coating layer contains a sufficient amount of a binder and therefore can maintain adhesion among the particles of the powdery carbon material and adhesion between the conductive substrate and the coating layer.

(Acid-Modified Polyvinylidene Fluorides)

Acid-modified polyvinylidene fluoride is contained as a binder in the coating layer.

The term "acid-modified" means that polyvinylidene fluoride has been partly defluorinated, and an acid or an acid derivative has been added to the resultant unsaturated bonds. The defluorination may be performed by, for example, heating polyvinylidene fluoride. The acid that is newly added may be an organic acid. The acid-modified polyvinylidene fluoride attains an enhanced adhesion with respect to metal foils by virtue of the acid that is added.

Examples of the acids and the acid derivatives used for the acid modification include acrylic acid, methacrylic acid, methyl acrylate, ethyl acrylate, butyl acrylate, methyl methacrylate, ethyl methacrylate, butyl methacrylate, monomethyl maleate, monoethyl maleate, maleic anhydride, 2-carboxyethyl acrylate, 2-carboxyethyl methacrylate, acryloyloxyethylsuccinic acid, methacryloyloxyethylsuccinic acid, acryloyloxyethylphthalic acid, methacryloyloxyethylphthalic acid, trifluoroacrylic acid, trifluoromethylacrylic acid, 1,1-bis(acryloyloxymethyl)ethyl isocyanate, 2-acryloyloxyethyl isocyanate and 2-methacryloyloxyethyl isocyanate. From the point of view of the adhesion with metal foils, polyvinylidene fluoride monomethyl maleate, and polyvinylidene fluorides modified with maleic anhydride, methyl acrylate or methyl methacrylate may be suitably used as the acid-modified polyvinylidene fluorides.

The proportion of structural units derived from unmodified vinylidene fluoride is preferably 90 to 99.9 mol %, and more preferably 95 to 99.9 mol % of all the structural units in the acid-modified polyvinylidene fluoride taken as 100 mol %. When the structural units derived from unmodified vinylidene fluoride represents 90 mol % or above, the coating layer exhibits good resistance to swelling with an electrolytic solution in an electrical storage device using the current collector of the present invention. The proportion of structural units derived from modified vinylidene fluoride is preferably 0.1 to 10 mol %, and more preferably 0.1 to 5 mol %. When the structural units derived from modified vinylidene fluoride represents 0.1 mol % or above, the coating layer ensures sufficient adhesion with respect to the conductive substrate.

The weight average molecular weight of the acid-modified polyvinylidene fluoride is not particularly limited, but is preferably $2.0 \times 10^5$ to $1.4 \times 10^6$, and more preferably $2.5 \times 10^5$ to $1.3 \times 10^6$. When the weight average molecular weight is $2.0 \times 10^5$ or above, good adhesion with the conductive substrate is exhibited. When the weight average molecular weight is $1.4 \times 10^6$ or less, the coating liquid attains a viscosity suited for gravure coating. The "weight average molecular weight" is the value measured by gel permeation chromatography (Shodex (registered trademark) GPC-101, manufactured by SHOWA DENKO K.K.) under the following conditions with Pullulan standard calibration curve.

Analysis columns: (1) OHpak SB-803HQ, (2) OHpak SB-804HQ, manufactured by SHOWA DENKO K.K.

Reference column: OHpak SB-800RL, manufactured by SHOWA DENKO K.K.

Column temperature: 40° C.

Sample: 0.1 mass measurement sample concentration

Flow rate: 1 mL/min

Eluent: 0.1 M aqueous sodium nitrate solution

Detector: RI-71S

The content of the acid-modified polyvinylidene fluoride in the coating layer is preferably 55.0 to 85.0 mass %, more preferably 57.5 to 82.5 mass %, and still more preferably 60.0 to 80.0 mass %. The ratio of the powdery carbon material to the acid-modified polyvinylidene fluoride (mass of powdery carbon material:mass of acid-modified polyvinylidene fluoride) is preferably 20:80 to 40:60, and more preferably 25:75 to 35:65.

The acid-modified polyvinylidene fluoride, when its content in the coating layer is 55.0 mass % or above, ensures good adhesion with the conductive substrate and prevents falling of the carbon fine particles from the coating layer. When the content of the acid-modified polyvinylidene fluoride is 85.0 mass % or less, the powdery carbon material can represent a sufficient proportion to ensure high conductive properties.

(Polyvinylpyrrolidones)

Polyvinylpyrrolidone is contained in the coating layer in order to help the powdery carbon material be uniformly dispersed.

The weight average molecular weight of the polyvinylpyrrolidone is preferably $5.0 \times 10^3$ to $1.4 \times 10^6$, and more preferably $1.0 \times 10^4$ to $1.3 \times 10^6$. The "weight average molecular weight" is the value measured by gel permeation chromatography (Shodex (registered trademark) GPC-101, manufactured by SHOWA DENKO K.K.) under the aforementioned conditions with Pullulan standard calibration curve. When the weight average molecular weight is in the above range, the powdery carbon material is allowed to be dispersed favorably in the coating liquid of the fluorine-free vinyl polymer, the coating liquid being described later, and the coating liquid is prevented from gaining a viscosity or having aggregates of carbon fine particles during the application process. This fluorine-free vinyl polymer probably adsorbs favorably to the surface of the powdery carbon material and exerts an action such as electrostatic repulsion or steric hindrance to suppress the aggregation of the particles of the powdery carbon material.

The content of the polyvinylpyrrolidone in the coating layer is 0.099 to 5.0 mass %, preferably 0.2 to 4.0 mass %, and more preferably 0.3 to 3.0 mass %.

When the content of the polyvinylpyrrolidone in the coating layer is in the range of 0.099 to 5.0 mass %, the powdery carbon material is allowed to be dispersed favorably in the coating liquid for forming coating layers, and the coating liquid can form a uniform coating layer. If the content of the polyvinylpyrrolidone is less than 0.099 mass %, the powdery carbon material comes to be poorly dispersed in the coating liquid and forms aggregates to make it difficult to control precisely the thickness during the formation of an electrode layer. If the content of the polyvinylpyrrolidone is above 5.0 mass %, the resistance of electrical storage devices is disadvantageously increased. Although the reasons why the resistance is increased are not clear, it is probable that while the acid-modified polyvinylidene fluoride tends to have point contacts with the carbon particles and the conductive substrate, the polyvinylpyrrolidone will cover the surface of the carbon particles to loosen the electrical contact among the carbon particles and between the carbon particles and the conductive substrate, causing an increase in resistance.

The content of the polyvinylpyrrolidone in the coating layer is measured by pyrolytic gas chromatography mass spectrometry (GC/MS). The coating liquid containing the polyvinylpyrrolidone, or a foil coated therewith, is analyzed at a pyrolysis temperature of 550° C. and a column flow rate of 1 mL/min, and the chromatogram and mass spectrum thus obtained are compared with known data to identify polyvinylpyrrolidone. From the area of the identified peak, the content of polyvinylpyrrolidone is determined using a calibration curve, which is prepared beforehand with respect to, for example, three pieces of data, specifically, 0.1, 1.0 and 5.0 parts by mass of polyvinylpyrrolidone.

The coating layer may contain additional resin components other than the acid-modified polyvinylidene fluoride and the polyvinylpyrrolidone while still achieving the advantageous effects of the present invention. Such additional resins are not limited and may be, for example, resin compounds resulting from the crosslinking of polysaccharide polymers or derivatives thereof with crosslinking agents. Use may be made of other resins such as polyacrylic resins, polyolefin resins, polyether resins, polyamides, polyimides, polyamidimides and epoxy resins. To attain low resistance of electrical storage devices, such additional resin components are preferably absent.

[Coating Liquids for Producing Current Collectors for Electrical Storage Devices]

A coating liquid for forming a current collector for electrical storage device according to a preferred embodiment of the present invention includes a powdery carbon material, acid-modified polyvinylidene fluoride, polyvinylpyrrolidone and a solvent.

N-methyl-2-pyrrolidone (NMP) may be used as the solvent, in which case the coating liquid shows little changes in concentration during the application process and will form a coating layer with a uniform thickness. Further, this solvent can be sufficiently removed by heat treatment.

The solvent in the coating liquid may further include a $C_{1-6}$ alkyl alcohol. Specific examples thereof include methanol, ethanol, isopropanol and hexanol, with isopropanol being preferable. The concurrent use of an alkyl alcohol is expected to effectively enhance the dispersibility of components in the coating liquid and will make uniform and smooth the surface of the coating layer that is formed. When the alkyl alcohol is used concurrently, it is preferable that N-methyl-2-pyrrolidone and the alkyl alcohol be used in such amounts that the ratio of the amount (parts by mass) of N-methyl-2-pyrrolidone to the amount (parts by mass) of the alkyl alcohol is 95:5 to 50:50. When the proportion of the alkyl alcohol is 5 parts by mass or more, the coating layer formed attains a uniform surface. When the proportion thereof is 50 parts by mass or less, the coating liquid can be used without aggregation of the resin components.

Other additives such as organic dyes may be sometimes added to enhance dispersibility. From the point of view of the fastness to light such as indoor light, it is preferable that such additives be not used.

The total content of the powdery carbon material, the acid-modified polyvinylidene fluoride and the polyvinylpyrrolidone is 2 to 20 mass % of the coating liquid, and is preferably 2 to 17.5 mass %, and more preferably 2 to 15 mass %.

The proportion of the mass of the powdery carbon material to the total mass of the powdery carbon material, the acid-modified polyvinylidene fluoride and the polyvinylpyrrolidone in the coating liquid is preferably 15.0 to 45.0 mass %, more preferably 17.5 to 42.5 mass %, and still more preferably 20.0 to 40.0 mass %. When the mass proportion of the powdery carbon material is 15.0 mass % or above, the coating liquid can form coating layers having sufficient conductive properties. When the mass proportion of the powdery carbon material is 45.0 mass % or less, the coating layer that is formed contains a sufficient amount of the binder and therefore can maintain adhesion among the particles of the powdery carbon material and adhesion between the conductive substrate and the coating layer.

The proportion of the mass of the acid-modified polyvinylidene fluoride to the total mass of the powdery carbon material, the acid-modified polyvinylidene fluoride and the polyvinylpyrrolidone in the coating liquid is preferably 55.0 to 85.0 mass %, more preferably 57.5 to 82.5 mass %, and still more preferably 60.0 to 80.0 mass %. The ratio of the powdery carbon material to the acid-modified polyvinylidene fluoride (mass of powdery carbon material:mass of acid-modified polyvinylidene fluoride) is 20:80 to 40:60, and preferably 25:75 to 35:65. When the mass proportion of the acid-modified polyvinylidene fluoride is 55.0 mass % or above, the coating layer that is formed ensures good adhesion with the conductive substrate and does not drop the carbon fine particles. When the mass proportion of the acid-modified polyvinylidene fluoride is 85.0 mass % or less, the coating layer that is formed can contain the powdery carbon material in a sufficient amount to ensure high conductive properties.

The content of the polyvinylpyrrolidone is 0.099 to 5.0 parts by mass, preferably 0.2 to 4.0 parts by mass, and more preferably 0.3 to 3.0 parts by mass per 100 parts by mass of the total of the powdery carbon material and the acid-modified polyvinylidene fluoride in the coating liquid. When the content of the polyvinylpyrrolidone is in the range of 0.099 to 5.0 parts by mass, the powdery carbon material is allowed to be dispersed favorably in the slurry, and the slurry can form a uniform coating layer. If the content of the polyvinylpyrrolidone is less than 0.099 parts by mass, the powdery carbon material comes to show poor dispersibility and forms aggregates to deteriorate application properties. If the content of the polyvinylpyrrolidone is above 5.0 parts by mass, the slurry viscosity is so increased that application properties are deteriorated, and also the resistance of electrical storage devices is disadvantageously increased.

When the coating liquid contains the powdery carbon material, the acid-modified polyvinylidene fluoride and the polyvinylpyrrolidone in the total content described above, satisfies the aforementioned proportions of the powdery carbon material, the acid-modified polyvinylidene fluoride and the polyvinylpyrrolidone, and contains N-methyl-2-pyrrolidone (NMP) as a solvent, the powdery carbon material is dispersed favorably and the liquid attains an appropriate viscosity to allow for a selection of a common coating technique, thus facilitating the fabrication of current collectors for electrical storage devices. The viscosity of the coating liquid at temperatures where its application takes place is preferably 20 to 200 mPa·s, more preferably 20 to 150 mPa·s, and still more preferably 20 to 100 mPa·s. With a viscosity of not more than 200 mPa·s, the coating liquid can be easily applied to the substrate. When the viscosity is 20 mPa·s or above, the coating liquid can form a sufficiently thick film on the substrate.

The viscosity is measured with a Brookfield viscometer while selecting a rotor and a rotational speed that are appropriate for the viscosity range of interest. When, for example, the coating liquid is expected to have a viscosity of about 100 mPa·s, the measurement may be performed with No. 2 rotor at a rotational speed of 60 rpm and a measurement temperature of 20 to 25° C.

[Methods for Producing Current Collectors for Electrical Storage Devices]

A method of the present invention for producing a current collector for electrical storage device includes: a step of preparing a coating liquid including a powdery carbon material, acid-modified polyvinylidene fluoride, polyvinylpyrrolidone and a solvent; a step of applying the coating liquid to one or both sides of a sheet-shaped conductive substrate; and a step of drying the coating liquid applied. The powdery carbon material, the acid-modified polyvinylidene fluoride and the polyvinylpyrrolidone are the same as described hereinabove.

The coating liquid may be applied to one or both sides of a conductive substrate by any technique without limitation. A general coating technique such as gravure coating, die coating, bar coating, spin coating or nip coating may be used. From the point of view of high throughput, gravure coating is preferably used.

In the drying step, the coating liquid that has been applied is dried to form a coating layer on the substrate. To ensure that the solvent will be evaporated sufficiently, the drying is preferably performed at a temperature of 50° C. or above.

In the case where the coating liquid contains a thermosetting resin component, such a resin component is preferably cured. When a thermosetting resin is contained, it is more preferable that the film be dried at a temperature that is not less than the curing temperature (the crosslinking temperature) of the resin. The coating liquid may contain an agent that promotes the curing reaction, such as a catalyst, a polymerization agent or a crosslinking agent.

[Electrodes]

An electrical storage device which has the current collector of the present invention will be described with respect to a lithium ion secondary battery as an example. While the current collector for electrical storage device of the present invention is expected to provide high effects when applied to an electrode containing a high-voltage positive electrode active material, the application is not limited to any particular positive electrode current collector and is possible even to a negative electrode current collector. The current collector for electrical storage device of the present invention can attain a reduction in the interface resistance between the current collector and a positive or negative electrode, thus realizing an electrical storage device with low resistance.

A positive electrode is formed by applying a slurry in which a positive electrode active material, a positive electrode conductive auxiliary and a binder are dissolved or dispersed in a solvent, onto the current collector for electrical storage device of the present invention, and drying the film. Here, the binder may be generally one which can be dissolved into an organic solvent-based medium, such as PVDF. An aqueous slurry containing such a binder as SBR or acrylic resin may be used.

The positive electrode active material and the positive electrode conductive auxiliary may be known such materials.

Some preferred positive electrode active materials are, for example, lithium cobalt oxide ($LiCoO_2$), lithium manganese oxide ($LiMn_2O_4$), lithium nickel oxide ($LiNiO_2$), ternary lithium compounds ($Li(Co_xMn_yNi_z)O_2$) resulting from partial substitution of lithium cobalt oxide with Mn and Ni in place of Co, ($Li(Ni_xCo_yAl_z)O_2$) resulting from partial substitution of lithium nickel oxide with Co and Al in place of Ni, and olivines ($LiFePO_4$, $LiMnPO_4$). Some preferred positive electrode conductive auxiliaries are, for example, carbon blacks such as acetylene black, furnace black and Ketjen black, gas-phase carbon fibers and graphite fine particles.

A negative electrode is formed by applying a slurry in which a negative electrode active material, a negative electrode conductive auxiliary and a binder are dissolved or dispersed in a solvent, onto the current collector for electrical storage device of the present invention, and drying the film. Here, the binder is generally PVDF or the like where the solvent is an organic solvent, and is generally SBR, acrylic resin or the like when the solvent is an aqueous solvent.

The negative electrode active material and the negative electrode conductive auxiliary may be known such materials.

Some preferred negative electrode active materials are, for example, graphites such as natural graphite and artificial granite, alloys including silicon or tin, titanium-containing oxides such as lithium titanium oxide, and mixtures thereof. Some preferred negative electrode conductive auxiliaries are, for example, carbon blacks such as acetylene black, furnace black and Ketjen black, and gas-phase carbon fibers.

[Lithium Ion Secondary Batteries]

A lithium ion secondary battery according to an aspect of the present invention includes the electrode described above. The electrode is such that a coating layer is formed on a conductive substrate to form a current collector, and the coating layer bears an electrode active material layer including a positive electrode or negative electrode active material, a conductive auxiliary and a binder. Such a positive or negative electrode is assembled with a counter negative or positive electrode via a separator. The resultant assembly is placed into an exterior case, and the case is filled with an electrolyte.

The electrolyte, the separator and the exterior case which constitute the electrical storage device together with the electrodes may be known such elements. The electrolyte is not limited to a liquid and may be a gel or a solid. Some preferred separators are, for example, films of polymers such as polypropylene and polyethylene.

The lithium ion secondary battery is ready for discharging when the positive electrode and the negative electrode are connected to a load such as a motor or a light source, and can be charged by being connected to a power supply.

The lithium ion secondary battery can attain a reduction in electrode resistance by its containing a current collector which has the coating layer of the present invention on the surface of a conductive substrate, as compared to when a conventional current collector is used. That is, the internal resistance of the lithium ion secondary battery can be lowered. When a high-voltage active material is used, the lithium ion secondary battery can be charged at a high voltage by virtue of the use of the current collector for electrical storage device of the present invention, and thus can attain a high capacity.

EXAMPLES

The following materials were used in Examples and Comparative Examples.

- Acetylene black—Product name: DENKA BLACK (registered trademark) HS-100 manufactured by Denka Company Limited, average primary particle size 48 nm, BET specific surface area 39 m$^2$/g, electric resistivity 0.14 Ω·cm
- Ketjen black—Product name: Ketjen black EC300J manufactured by Lion Specialty Chemicals Co., Ltd., average primary particle size 39.5 nm, BET specific surface area 800 m$^2$/g
- Polyvinylidene fluoride—Acid-modified PVDF, product name: SOLEF 5120 manufactured by SOLVAY, Mw=6.7×10$^5$, modified with acrylic acid
- Polyvinylidene fluoride—Acid-modified PVDF, product name: SOLEF 5130 manufactured by SOLVAY, Mw=1.2×10$^6$, modified with acrylic acid
- Polyvinylidene fluoride—Acid-modified PVDF, product name: KF Polymer W #9100 manufactured by KUREHA CORPORATION, Mw=2.8×10$^5$, modified with acrylic acid
- Polyvinylidene fluoride—No acid-modified homo PVDF, product name: Kynar HSV-900 manufactured by Arkema, Mw=7.2×10$^5$
- Polyvinylidene fluoride—No acid-modified copolymer PVDF, product name: KF Polymer W #9300 manufactured by KUREHA CORPORATION, Mw=1.0×10$^6$, vinylidene fluoride/hexafluoropropene copolymer
- Polyvinylidene fluoride—Acid-modified PVDF aqueous dispersion, product name: Solef XPH-838 manufactured by SOLVAY
- Polyvinylidene fluoride—No acid-modified homo PVDF, product name: KF Polymer W #1100 manufactured by KUREHA CORPORATION, Mw=2.8×10$^5$
- Polyvinylpyrrolidone PVP—Product name: PITZCOL K-30 manufactured by DKS Co. Ltd., Mw=4.5×10$^4$
- Polyvinylpyrrolidone PVP—Product name: PITZCOL K-90 manufactured by DKS Co. Ltd., Mw=1.2×10$^6$
- Polyvinyl acetate PVAc manufactured by JAPAN VAM & POVAL CO., LTD.
- Polyvinyl alcohol PVA manufactured by JAPAN VAM & POVAL CO., LTD.
- Poly-N-vinylacetamide—Product name: PNVA manufactured by SHOWA DENKO K.K.
- Vinyl alcohol/vinylpyrrolidone graft polymer P(VA-VP)—Product name: PITZCOL V-7154 manufactured by DKS Co. Ltd.
- N-methyl-2-pyrrolidone (NMP) manufactured by Mitsubishi Chemical Corporation
- Isopropyl alcohol manufactured by Yamaichi Chemical Industries Co., Ltd.

[Evaluation of Coating Liquids]
⟨Dispersibility of Powdery Carbon Material⟩

The dispersibility of a powdery carbon material in a coating liquid was evaluated by dropping 5 mL of the coating liquid onto the wall surface of a 50-mL glass test tube that had been held vertically, and visually observing the wall surface after 15 minutes. The dispersibility was evaluated as good ("AA" in Tables 1 and 2) when there were no aggregates on the wall surface, and was evaluated as poor ("CC" in Tables 1 and 2) when aggregates were found.

[Evaluation of Current Collectors for Electrical Storage Devices]
⟨Adhesion of Coating Layer with Respect to Conductive Substrate⟩

The adhesion of a coating layer with respect to a conductive substrate was evaluated in the following two manners. Good results in both tests are shown as "AA" in Tables 1 and 2, and bad results in either or both tests are indicated by "CC" in Tables 1 and 2.

(Adhesion Evaluation 1 (Cellophane Tape Test))

A 5 cm piece of Cellophane tape (Product name: No. 29) manufactured by NITTO DENKO CORPORATION was applied to a current collector fabricated in Example or Comparative Example, and a 1 kg roller was moved back and forth five times on the tape. Immediately thereafter, the Cellophane tape was peeled from an end thereof. The adhesion was evaluated as good, shown as "AA" in Tables 1 and 2, when the coating layer was not separated and the conductive substrate was not exposed, and was evaluated as poor, indicated by "CC" in Tables 1 and 2, when the coating layer was separated to expose the conductive substrate.

(Adhesion Evaluation 2 (Dry Cotton Swab Test))

A dry cotton swab (product name: Koukin Kamijiku Menbou (antibacterial paper-shafted cotton swabs) manufactured by KAWAMOTO CORPORATION) was caused to slide on the surface of a coating layer in a current collector fabricated in Example or Comparative Example, over a length of 5 cm ten times (one way was counted as one time) at a speed of 5 cm/s under a load of 100 g. The adhesion was evaluated as good, shown as "AA" in Tables 1 and 2, when the coating layer was not separated and the conductive substrate was not exposed, and was evaluated as poor, indicated by "CC" in Tables 1 and 2, when the coating layer was separated to expose the conductive substrate.

⟨Surface Roughness Ra of Coating Layer Formed on Conductive Substrate⟩

To determine the surface roughness Ra of a coating layer formed on a conductive substrate, an image was captured with Profilometer Laser Microscope VK-200 manufactured by KEYENCE CORPORATION at ×20 magnification, and the profile graph measured with respect to a straight line parallel to the gravure coating direction was analyzed in accordance with JIS B0601: 2001.

[Evaluation of Lithium Ion Secondary Batteries]
⟨Fabrication of Positive Electrode Sheet⟩

While performing stirring and mixing, N-methyl-2-pyrrolidone was added appropriately to 90 parts by mass of LiFePO$_4$ (M121 manufactured by Aleees) as a positive electrode active material, 5 parts by mass of conductive carbon black (SUPER P manufactured by Imerys) as a conductive auxiliary and 5 parts by mass of polyvinylidene fluoride (Kynar HSV-900 manufactured by Arkema) as a binder. A slurry dispersion was thus prepared. The dispersion was applied to a coating layer of a current collector fabricated in Example or Comparative Example, with use of a doctor blade having 200 μm clearance. The film was dried and pressed. A positive electrode sheet was thus obtained.

⟨Fabrication of Negative Electrode Sheet⟩

While performing stirring and mixing, water was added appropriately to 95 parts by mass of artificial graphite (SCMG (registered trademark)-AR manufactured by SHOWA DENKO K.K.) as a negative electrode active material, 1 part by mass of conductive carbon black (SUPER P manufactured by Imerys) as a conductive auxiliary, 3 parts by mass (in terms of solid) of styrene butadiene rubber (BM-400B manufactured by ZEON CORPORATION) as a binder and 1 part by mass (in terms of solid) of carboxymethylcellulose (#1380 manufactured by DAICEL FINECHEM LTD.) as a thickener. A slurry dispersion was thus prepared. The dispersion was applied to a 20 μm thick copper foil with use of a doctor blade having 200 μm clearance. The film was dried and pressed. A negative electrode sheet was thus obtained.

⟨Fabrication of Test Laminate Cell⟩

The positive electrode sheet and the negative electrode sheet fabricated as described above were superimposed one on top of the other with a polypropylene separator (Celgard 2500 manufactured by Celgard, LLC.) disposed therebetween. The resultant stack was placed into an aluminum laminate package, and an electrolytic solution was poured. The aluminum laminate package was heat sealed in vacuum to give a test laminate cell.

The electrolytic solution contained 1 mol/L $LiPF_6$ as an electrolyte and 1 mass % vinylene carbonate as an additive in a 3:7 by volume mixed solvent of ethylene carbonate and ethyl methyl carbonate.

The cell fabricated above had a rated capacity of 100 mAh (1 C=100 mA).

⟨Evaluation of Direct Current Internal Resistance (DC-IR) of Battery⟩

The cell was subjected to initial charging and discharging, and was adjusted to 50% state of charge (SOC). At room temperature, the cell was discharged at five magnitudes of current between 0.1 C and 2 C each for 5 seconds. The voltage changes before and after the discharging were measured with a charge-discharge test system (TOSCAT-3000 manufactured by TOYO SYSTEM Co., LTD.). The direct current internal resistance (DC-IR) of the battery was evaluated by calculating the average of voltage change/current value ratios at the five magnitudes of current.

Example 1-1

70 Parts by mass of acid-modified PVDF (Mw=$6.7 \times 10^5$), 30 parts by mass of acetylene black (HS-100) and 0.1 part by mass of polyvinylpyrrolidone (K-30) were provided. N-methyl-2-pyrrolidone and isopropyl alcohol were added thereto so that the solid concentration would be 5 mass %. The ratio of the amount (parts by mass) of N-methyl-2-pyrrolidone to the amount (parts by mass) of isopropyl alcohol was 84:16. The mixture liquid was mixed with a disperger-type stirrer (Excel Autohomogenizer manufactured by Nippon Seiki Co., Ltd.) at 4000 rpm for 30 minutes to give a coating liquid. Table 1 describes the amounts (parts by mass) of the powdery carbon material, the acid-modified PVDF and the polyvinylpyrrolidone, and the contents (mass %) of the components in a coating layer formed from the coating liquid. The dispersibility of carbon black in the coating liquid was evaluated as good, with no aggregates being found (FIG. 1). The viscosity of the coating liquid was 78 mPa·s (Table 1).

Next, a 15 μm thick aluminum foil made of A1N30 was provided. The coating liquid was poured into the liquid container (pan) of a gravure coater (manufactured by Nakajima Seiki Industry Co., Ltd. (now Uniontech Co, Ltd.), and the gravure roll was rotated at a constant speed. The aluminum foil was brought into contact with the gravure roll, and was coated while being conveyed in the direction opposite to the rotational direction. The coating liquid applied to the foil was dried. During this process, no streaks were generated (FIG. 3) on the blank portions (which corresponds to portions where no coating layer is formed) and on the engraved portions (which corresponds to portions where a coating layer is formed) of the gravure roll. The coating liquid was thus demonstrated to have good dispersibility of carbon black and to be applicable to gravure coating.

In the current collector obtained above, the basis weight of the coating layer was 0.34 $g/m^2$. The adhesion of the coating layer of the current collector was evaluated. In the adhesion evaluation 1, the aluminum foil remained covered and invisible (FIG. 5). Next, the coating layer was subjected to the adhesion evaluation 2 and showed no exposure of the aluminum foil (FIG. 7). The surface roughness Ra was 0.55 μm (Table 1). Using the current collector, a secondary battery was fabricated in the manner described hereinabove. The internal resistance of the battery was measured to be 312 mΩ (Table 1).

Examples 1-2 to 1-4

Coating liquids were prepared, gravure coated, and dried to form current collectors in the same manner as in Example 1-1, except that the amounts of the components were changed as described in Table 1. The current collectors were evaluated in the same manner as in Example 1-1. The results are described in Table 1.

Comparative Example 1-1

A coating liquid was prepared in the same manner as in Example 1-1, except that the amount of polyvinylpyrrolidone was changed to 0 part by mass. FIG. 2 illustrates the result of the evaluation of the dispersibility of the coating liquid. As illustrated, aggregates were present and the dispersibility was poor. Here, 0 part by mass means that the component was not added (the same applies hereinafter). The viscosity of the coating liquid was 146 mPa·s (Table 1). The coating liquid was poured into the liquid container of the gravure coater described above, and the gravure roll was rotated at a constant speed similarly to Example 1-1. At this stage (where no aluminum foil was in contact with the gravure roll), streaks were found on the blank portions of the gravure roll (FIG. 4).

These streaks were probably ascribed to the low dispersibility of acetylene black and the consequent formation of aggregates. Streaks were not found on the engraved portions of the gravure roll, probably because aggregates had entered the fine recesses (in which the coating liquid was held) present in the engraved portions to lessen the occurrence of streaks, and streaks were less visible to the naked eye. Due to the occurrence of streaks, gravure coating of this coating liquid was infeasible, and the desired current collector could not be obtained.

Comparative Examples 1-2 and 1-3

Coating liquids were prepared and current collectors were produced in the same manner as in Example 1-1, except that the amount of polyvinylpyrrolidone was changed to 6.0 parts by mass and 10.0 parts by mass, respectively. The coating liquids were tested to evaluate the dispersibility of carbon black and to measure the viscosity (Table 1). The current collectors were subjected to adhesion evaluation and surface roughness Ra measurement (Table 1). Secondary batteries were fabricated and their internal resistances were evaluated. The internal resistances were higher than those of Examples 1-1 to 1-4 (Table 1).

The secondary batteries showed a high internal resistance probably because the polyvinylpyrrolidone, which had been added in an increased amount, acted as an insulating component and deteriorated conductive properties.

Examples 2-1 to 4

Coating liquids were prepared in the same manner as in Examples 1-1 to 1-4, respectively, except that the acid-modified PVDF (Mw=6.7×10$^5$) was replaced by acid-modified PVDF (Mw=1.2×10$^6$), and that N-methyl-2-pyrrolidone and isopropyl alcohol were added thereto so that the concentration would be 3 mass % (the ratio of the amount (parts by mass) of N-methyl-2-pyrrolidone to the amount (parts by mass) of isopropyl alcohol was 85:15). The coating liquids were tested to evaluate the dispersibility and to measure the viscosity, and were applied to produce current collectors, which were then tested to evaluate the adhesion and the surface roughness Ra. Secondary batteries were fabricated and their internal resistances were evaluated. The evaluation results are described in Table 1.

Comparative Examples 2-1 to 3

The evaluations were made in the same manner as in Example 2-1, except that the amount of polyvinylpyrrolidone was changed to 0, 6.0 and 10.0 parts by mass, respectively. The evaluation results are described in Table 1.

Examples 3-1 to 4

Coating liquids were prepared in the same manner as in Examples 1-1 to 1-4, respectively, except that the acid-modified PVDF (Mw=6.7×10$^5$) was replaced by acid-modified PVDF (Mw=2.8×10$^5$), and that N-methyl-2-pyrrolidone and isopropyl alcohol were added thereto so that the solid concentration would be 7 mass %. The coating liquids were tested to evaluate the dispersibility and to measure the viscosity, and were applied to produce current collectors, which were then tested to evaluate the adhesion and the surface roughness Ra. Secondary batteries were fabricated and their internal resistances were evaluated. The evaluation results are described in Table 1.

Comparative Examples 3-1 to 3

The evaluations were made in the same manner as in Example 3-1, except that the amount of polyvinylpyrrolidone was changed to 0, 6.0 and 10.0 parts by mass, respectively. The evaluation results are described in Table 1.

Examples 4-1 to 4

Coating liquids were prepared in the same manner as in Examples 1-1 to 1-4, respectively, except that the polyvinylpyrrolidone (K-30) was replaced by polyvinylpyrrolidone (K-90). The coating liquids were tested to evaluate the dispersibility and to measure the viscosity, and were applied to produce current collectors, which were then tested to evaluate the adhesion and the surface roughness Ra. Secondary batteries were fabricated and their internal resistances were evaluated. The evaluation results are described in Table 1.

Comparative Examples 4-1 to 3

The evaluations were made in the same manner as in Example 4-1, except that the amount of polyvinylpyrrolidone was changed to 0, 6.0 and 10.0 parts by mass, respectively. The evaluation results are described in Table 1.

Comparative Example 5

A coating liquid was prepared in the same manner as in Example 1-3, except that the acid-modified PVDF (Mw=6.7×10$^5$) was replaced by homo PVDF (Mw=7.2×10$^5$), and that N-methyl-2-pyrrolidone and isopropyl alcohol were added thereto so that the solid concentration would be 6.5 mass %. The coating liquid was tested to evaluate the dispersibility, and was applied to produce a current collector, which was then tested to measure the surface roughness Ra (Table 1). Next, the adhesion evaluation 1 was performed, resulting in the aluminum foil being exposed (FIG. 6). The aluminum foil was also exposed in the adhesion evaluation 2 (FIG. 8).

The poor performance in the adhesion evaluations probably stemmed from insufficient bonding properties of the homo PVDF with respect to the aluminum foil. During the fabrication of a secondary battery, an attempt was made to form an electrode layer for the evaluation of internal resistance, but this step resulted in a separation of the coating layer from the aluminum foil due to the low adhesion. Consequently, it was impossible to fabricate a secondary battery and to evaluate its internal resistance.

Comparative Example 6

A coating liquid was prepared in the same manner as in Example 1-3, except that the acid-modified PVDF (Mw=6.7×10$^5$) was replaced by copolymer PVDF (Mw=1.0×10$^6$), and that N-methyl-2-pyrrolidone and isopropyl alcohol were added thereto so that the solid concentration would be 4 mass %. The coating liquid was tested to evaluate the dispersibility, and was applied to produce a current collector, which was then tested to evaluate the adhesion and to measure the surface roughness Ra (Table 1). The aluminum foil was not exposed in the adhesion evaluation 1, but was exposed in the adhesion evaluation 2. During the fabrication of a secondary battery, an attempt was made to form an electrode layer for the evaluation of internal resistance, but this step resulted in a separation of the coating layer from the aluminum foil substrate due to the low adhesion. Consequently, it was impossible to fabricate a secondary battery and to evaluate its internal resistance.

Comparative Example 7

A coating liquid was prepared in the same manner as in Example 1-3, except that the acid-modified PVDF (Mw=6.7×10$^5$) was replaced by PVDF aqueous dispersion, and that water was added thereto so that the solid concentration would be 6 mass %. This coating liquid was poor in dispersibility and contained aggregates (Table 1). Similarly to Comparative Example 1-1, the desired sample could not be obtained.

Comparative Example 8

A coating liquid was prepared in the same manner as in Example 1-3, except that the polyvinylpyrrolidone (K-30) was replaced by polyvinyl acetate. This coating liquid was poor in dispersibility and contained aggregates (Table 1). Similarly to Comparative Example 1-1, the desired sample could not be obtained.

Comparative Example 9

A coating liquid was prepared in the same manner as in Example 1-3, except that the polyvinylpyrrolidone (K-30) was replaced by polyvinyl alcohol. This coating liquid was poor in dispersibility and contained aggregates (Table 1). Similarly to Comparative Example 1-1, the desired sample could not be obtained.

Comparative Example 10

A coating liquid was prepared in the same manner as in Example 1-3, except that the polyvinylpyrrolidone (K-30) was replaced by poly-N-vinylacetamide. This coating liquid was poor in dispersibility and contained aggregates (Table 1). Similarly to Comparative Example 1-1, the desired sample could not be obtained.

Comparative Example 11

A coating liquid was prepared in the same manner as in Example 1-3, except that the polyvinylpyrrolidone (K-30) was replaced by vinyl alcohol/vinylpyrrolidone graft polymer. This coating liquid was poor in dispersibility and contained aggregates (Table 1). Similarly to Comparative Example 1-1, the desired sample could not be obtained.

Comparative Example 12

A coating liquid was prepared in the same manner as in Example 1-1, except that 44.2 parts by mass of homo PVDF (Mw=2.8×10$^5$), 46.5 parts by mass of Ketjen black (EC300J) and 9.3 parts by mass of polyvinylpyrrolidone (K-30) were provided. The coating liquid was tested to evaluate the dispersibility of carbon black and to measure the viscosity (Table 1), and was applied to produce a current collector.

The current collector obtained had a surface roughness Ra of 1.6 μm. This high surface roughness Ra, which exceeded 1.0 μm, was probably ascribed to the aggregation of Ketjen black which inhibited the formation of a coating layer with uniform thickness. Next, the adhesion evaluation 1 was performed, resulting in the aluminum foil being exposed. The aluminum foil was also exposed in the adhesion evaluation 2. The poor performance in the adhesion evaluations probably stemmed from insufficient bonding properties of the homo PVDF with respect to the aluminum foil. During the fabrication of a secondary battery, an attempt was made to form an electrode layer for the evaluation of internal resistance, but this step encountered with the same problem as in Comparative Example 5. Consequently, it was impossible to fabricate a secondary battery and to evaluate its internal resistance.

Example 13-1

A coating liquid was prepared in the same manner as in Example 1-1, except that 80 parts by mass of acid-modified PVDF (Mw=6.7×10$^5$), 20 parts by mass of acetylene black (HS-100) and 0.1 part by mass of polyvinylpyrrolidone (K-30) were provided, and that N-methyl-2-pyrrolidone and isopropyl alcohol were added thereto so that the solid concentration would be 6 mass %. The coating liquid was tested to evaluate the dispersibility of carbon black and to measure the viscosity, and was applied to produce a current collector, which was then tested to evaluate the adhesion and to measure the surface roughness Ra. A secondary battery was fabricated and its internal resistance was evaluated. The evaluation results are described in Table 2.

Example 13-2

A coating liquid was prepared in the same manner as in Example 1-1, except that 60 parts by mass of acid-modified PVDF (Mw=6.7×10$^5$), 40 parts by mass of acetylene black (HS-100) and 0.1 part by mass of polyvinylpyrrolidone (K-30) were provided. The coating liquid was tested to evaluate the dispersibility of carbon black and to measure the viscosity, and was applied to produce a current collector, which was then tested to evaluate the adhesion and to measure the surface roughness Ra. A secondary battery was fabricated and its internal resistance was evaluated. The evaluation results are described in Table 2.

Comparative Example 13-1

A coating liquid was prepared in the same manner as in Example 1-1, except that 90 parts by mass of acid-modified PVDF (Mw=6.7×10$^5$), 10 parts by mass of acetylene black (HS-100) and 0.1 part by mass of polyvinylpyrrolidone (K-30) were provided, that N-methyl-2-pyrrolidone and isopropyl alcohol were added thereto so that the solid concentration would be 3 mass %, and that the ratio of the amount (parts by mass) of N-methyl-2-pyrrolidone to the amount (parts by mass) of isopropyl alcohol was 85:15. The coating liquid was tested to evaluate the dispersibility of carbon black, and was applied to produce a current collector, which was then tested to evaluate the adhesion and to measure the surface roughness Ra. A secondary battery was fabricated and its internal resistance was evaluated. The evaluation results are described in Table 2.

The secondary battery exhibited a high internal resistance probably because the amount of the acid-modified PVDF was excessively large and the conductive properties of acetylene black were deteriorated.

Comparative Example 13-2

A coating liquid was prepared in the same manner as in Example 1-1, except that 30 parts by mass of acid-modified PVDF (Mw=6.7×10$^5$), 70 parts by mass of acetylene black (HS-100) and 0.1 part by mass of polyvinylpyrrolidone (K-30) were provided, and that N-methyl-2-pyrrolidone and isopropyl alcohol were added thereto so that the solid concentration would be 4.5 mass %. The coating liquid was tested to evaluate the dispersibility of carbon black, and was applied to produce a current collector, which was then tested to evaluate the adhesion and to measure the surface roughness Ra (Table 2).

The adhesion evaluation 1 resulted in the aluminum foil being exposed. The aluminum foil was also exposed in the adhesion evaluation 2. The reasons behind the poor performance in the adhesion evaluations were probably because the amount of acetylene black was excessively large and the bonding properties of the acid-modified PVDF with respect to the aluminum foil were lessened. During the fabrication of a secondary battery, an attempt was made to form an electrode layer for the evaluation of internal resistance, but this step encountered with the same problem as in Comparative Example 5. Consequently, it was impossible to fabricate a secondary battery and to evaluate its internal resistance.

Comparative Example 13-3

A coating liquid was prepared in the same manner as in Example 1-4, except that 10 parts by mass of acid-modified PVDF (Mw=$6.7 \times 10^5$), 90 parts by mass of acetylene black (HS-100) and 5 parts by mass of polyvinylpyrrolidone (K-30) were provided, and that N-methyl-2-pyrrolidone and isopropyl alcohol were added thereto so that the solid concentration would be 7 mass %. This coating liquid was poor in dispersibility and contained aggregates (Table 2).

The poor performance in the dispersibility evaluation probably resulted from the amount of acetylene black being excessively large. Due to the deteriorated dispersibility, the desired sample could not be obtained similarly to Comparative Example 1-1.

TABLE 1

| | Powdery carbon material | | | VDF polymer | | |
|---|---|---|---|---|---|---|
| | | Amount (Parts by mass) | Ratio (Mass %) | (Mw) | Amount (Parts by mass) | Ratio (Mass %) |
| Ex. 1-1 | Acetylene black HS-100 | 30 | 30.0 | Acid-modified PVDF powder ($6.7 \times 10^5$) | 70 | 69.9 |
| Ex. 1-2 | | | 29.9 | | | 69.7 |
| Ex. 1-3 | | | 29.7 | | | 69.3 |
| Ex. 1-4 | | | 28.6 | | | 66.7 |
| Comp. Ex. 1-1 | Acetylene black HS-100 | 30 | 30.0 | Acid-modified PVDE powder ($6.7 \times 10^5$) | 70 | 70.0 |
| Comp. Ex. 1-2 | | | 28.3 | | | 66.0 |
| Comp. Ex. 1-3 | | | 27.3 | | | 63.6 |
| Ex. 2-1 | Acetylene black HS-100 | 30 | 30.0 | Acid-modified PVDF powder ($1.2 \times 10^6$) | 70 | 69.9 |
| Ex. 2-2 | | | 29.9 | | | 69.7 |
| Ex. 2-3 | | | 29.7 | | | 69.3 |
| Ex. 2-4 | | | 28.6 | | | 66.7 |
| Comp. Ex. 2-1 | Acetylene black HS-100 | 30 | 30.0 | Acid-modified PVDF powder ($1.2 \times 10^6$) | 70 | 70.0 |
| Comp. Ex. 2-2 | | | 28.3 | | | 66.0 |
| Comp. Ex. 2-3 | | | 27.3 | | | 63.6 |
| Ex. 3-1 | Acetylene black HS-100 | 30 | 30.0 | Acid-modified PVDF powder ($2.8 \times 10^5$) | 70 | 69.9 |
| Ex. 3-2 | | | 29.9 | | | 69.7 |
| Ex. 3-3 | | | 29.7 | | | 69.3 |
| Ex. 3-4 | | | 28.6 | | | 66.7 |
| Comp. Ex. 3-1 | Acetylene black HS-100 | 30 | 30.0 | Acid-modified PVDF powder ($2.8 \times 10^5$) | 70 | 70.0 |
| Comp. Ex. 3-2 | | | 28.3 | | | 66.0 |
| Comp. Ex. 3-3 | | | 27.3 | | | 63.6 |
| Ex. 4-1 | Acetylene black HS-100 | 30 | 30.0 | Acid-modified PVDF powder ($6.7 \times 10^5$) | 70 | 69.9 |
| Ex. 4-2 | | | 29.7 | | | 69.3 |
| Ex. 4-3 | | | 29.9 | | | 69.7 |
| Ex. 4-4 | | | 28.6 | | | 66.7 |
| Comp. Ex. 4-1 | Acetylene black HS-100 | 30 | 30.0 | Acid-modified PVDF powder ($6.7 \times 10^5$) | 70 | 70.0 |
| Comp. Ex. 4-2 | | | 28.3 | | | 66.0 |
| Comp. Ex. 4-3 | | | 27.3 | | | 63.6 |
| Comp. Ex. 5 | Acetylene black HS-100 | 30 | 29.7 | Homo PVDF powder ($7.2 \times 10^5$) | 70 | 69.3 |
| Comp. Ex. 6 | Acetylene black HS-100 | 30 | 29.7 | Copolymer PVDF powder ($1.0 \times 10^6$) | 70 | 69.3 |
| Comp. Ex. 7 | Acetylene black HS-100 | 30 | 29.7 | PVDF aqueous dispersion | 70 (solid) | 69.3 |
| Comp. Ex. 8 | Acetylene black HS-100 | 30 | 29.7 | Acid-modified PVDF powder ($6.7 \times 10^5$) | 70 | 69.3 |

TABLE 1-continued

| | | | | | | |
|---|---|---|---|---|---|---|
| Comp. Ex. 9 | Acetylene black HS-100 | 30 | 29.7 | Acid-modified PVDF powder ($6.7 \times 10^5$) | 70 | 69.3 |
| Comp. Ex. 10 | Acetylene black HS-100 | 30 | 29.7 | Acid-modified PVDF powder ($6.7 \times 10^5$) | 70 | 69.3 |
| Comp. Ex. 11 | Acetylene black HS-100 | 30 | 29.7 | Acid-modified PVDF powder ($6.7 \times 10^5$) | 70 | 69.3 |
| Comp. Ex. 12 | Ketjen black EC300J | 46.5 | 46.5 | Homo PVDF powder ($2.8 \times 10^5$) | 44.4 | 44.4 |

| | | Fluorine-free vinyl polymer | | solvent N-methyl-2-pyrrolidone:iso-propyl alcohol [parts by mass] |
|---|---|---|---|---|
| | | Amount (Parts by mass) | Ratio (Mass %) | |
| Ex. 1-1 | PVP (K-30) | 0.1 | 0.10 | 84:16 |
| Ex. 1-2 | | 0.3 | 0.50 | 84:16 |
| Ex. 1-3 | | 1.0 | 0.99 | 84:16 |
| Ex. 1-4 | | 5.0 | 4.76 | 84:16 |
| Comp. Ex. 1-1 | PVP (K-30) | 0 | 0 | 84:16 |
| Comp. Ex. 1-2 | | 6.0 | 5.66 | 84:16 |
| Comp. Ex. 1-3 | | 10.0 | 9.09 | 84:16 |
| Ex. 2-1 | PVP (K-30) | 0.1 | 0.10 | 85:15 |
| Ex. 2-2 | | 0.5 | 0.50 | 85:15 |
| Ex. 2-3 | | 1.0 | 0.99 | 85:15 |
| Ex. 2-4 | | 5.0 | 4.76 | 85:15 |
| Comp. Ex. 2-1 | PVP (K-30) | 0 | 0 | 85:15 |
| Comp. Ex. 2-2 | | 6.0 | 5.66 | 85:15 |
| Comp. Ex. 2-3 | | 10.0 | 9.09 | 85:15 |
| Ex. 3-1 | PVP (K-30) | 0.1 | 0.10 | 84:16 |
| Ex. 3-2 | | 0.5 | 0.50 | 84:16 |
| Ex. 3-3 | | 1.0 | 0.99 | 84:16 |
| Ex. 3-4 | | 5.0 | 4.76 | 84:16 |
| Comp. Ex. 3-1 | PVP (K-30) | 0 | 0 | 84:16 |
| Comp. Ex. 3-2 | | 6.0 | 5.66 | 84:16 |
| Comp. Ex. 3-3 | | 10.0 | 9.09 | 84:16 |
| Ex. 4-1 | PVP (K-90) | 0.1 | 0.10 | 84:16 |
| Ex. 4-2 | | 1.0 | 0.99 | 84:16 |
| Ex. 4-3 | | 0.5 | 0.50 | 84:16 |
| Ex. 4-4 | | 5.0 | 4.76 | 84:16 |
| Comp. Ex. 4-1 | PVP (K-90) | 0 | 0 | 84:16 |
| Comp. Ex. 4-2 | | 6.0 | 5.66 | 84:16 |
| Comp. Ex. 4-3 | | 10.0 | 9.09 | 84:16 |
| Comp. Ex. 5 | PVP (K-30) | 1.0 | 0.99 | 84:16 |
| Comp. Ex. 6 | PVP (K-30) | 1.0 | 0.99 | 84:16 |
| Comp. Ex. 7 | PVP (K-30) | 1.0 | 0.99 | — |
| Comp. Ex. 8 | PVAc | 1.0 | 0.99 | 84:16 |
| Comp. Ex. 9 | PVA | 1.0 | 0.99 | 84:16 |
| Comp. Ex. 10 | PNVA | 1.0 | 0.99 | 84:16 |
| Comp. Ex. 11 | P (VA-VP) | 1.0 | 0.99 | 84:16 |
| Comp. Ex. 12 | PVP (K-30) | 9.3 | 9.3 | 84:16 |

TABLE 1-continued

| | Basis weight of coating layer [g/m²] | Dispersibility*) | Viscosity [mPa·s] | Adhesion Cellophane tape | Adhesion Dry cotton swab | Conclusion | Ra × 20 | Internal resistance [mΩ] |
|---|---|---|---|---|---|---|---|---|
| Ex. 1-1 | 0.34 | AA | 78 | AA | AA | AA | 0.55 | 312 |
| Ex. 1-2 | 0.33 | AA | | AA | AA | AA | 0.58 | 308 |
| Ex. 1-3 | 0.36 | AA | | AA | AA | AA | 0.62 | 304 |
| Ex. 1-4 | 0.38 | AA | 80 | AA | AA | AA | 0.58 | 310 |
| Comp. Ex. 1-1 | — | CC | 146 | — | — | — | — | — |
| Comp. Ex. 1-2 | 0.32 | AA | 96 | AA | AA | AA | 0.51 | 371 |
| Comp. Ex. 1-3 | 0.35 | AA | 129 | AA | AA | AA | 0.55 | 394 |
| Ex. 2-1 | 0.31 | AA | 91 | AA | AA | AA | 0.52 | 292 |
| Ex. 2-2 | 0.33 | AA | | AA | AA | AA | 0.58 | 294 |
| Ex. 2-3 | 0.34 | AA | | AA | AA | AA | 0.56 | 301 |
| Ex. 2-4 | 0.35 | AA | | AA | AA | AA | 0.58 | 294 |
| Comp. Ex. 2-1 | — | CC | | — | — | — | — | — |
| Comp. Ex. 2-2 | 0.36 | AA | | AA | AA | AA | 0.55 | 378 |
| Comp. Ex. 2-3 | 0.33 | AA | | AA | AA | AA | 0.51 | 399 |
| Ex. 3-1 | 0.33 | AA | 62 | AA | AA | AA | 0.54 | 324 |
| Ex. 3-2 | 0.33 | AA | | AA | AA | AA | 0.55 | 319 |
| Ex. 3-3 | 0.31 | AA | | AA | AA | AA | 0.64 | 315 |
| Ex. 3-4 | 0.37 | AA | | AA | AA | AA | 0.52 | 320 |
| Comp. Ex. 3-1 | — | CC | | — | — | — | — | — |
| Comp. Ex. 3-2 | 0.36 | AA | | AA | AA | AA | 0.50 | 369 |
| Comp. Ex. 3-3 | 0.34 | AA | | AA | AA | AA | 0.55 | 384 |
| Ex. 4-1 | 0.35 | AA | 76 | AA | AA | AA | 0.58 | 328 |
| Ex. 4-2 | 0.35 | AA | | AA | AA | AA | 0.47 | 320 |
| Ex. 4-3 | 0.35 | AA | | AA | AA | AA | 0.62 | 328 |
| Ex. 4-4 | 0.33 | AA | 79 | AA | AA | AA | 0.62 | 319 |
| Comp. Ex. 4-1 | — | CC | | — | — | — | — | — |
| Comp. Ex. 4-2 | 0.38 | AA | | AA | AA | AA | 0.51 | 401 |
| Comp. Ex. 4-3 | 0.37 | AA | 181 | AA | AA | AA | 0.49 | 389 |
| Comp. Ex. 5 | 0.34 | AA | | CC | CC | CC | 0.56 | — |
| Comp. Ex. 6 | 0.39 | AA | | AA | CC | CC | 0.54 | — |
| Comp. Ex. 7 | — | CC | | — | — | — | — | — |
| Comp. Ex. 8 | — | CC | | — | — | — | — | — |
| Comp. Ex. 9 | — | CC | | — | — | — | — | — |
| Comp. Ex. 10 | — | CC | | — | — | — | — | — |
| Comp. Ex. 11 | — | CC | | — | — | — | — | — |
| Comp. Ex. 12 | 0.33 | AA | 92 | CC | CC | CC | 1.60 | — |

*)Evaluation of Dispersibility—AA: Good, CC: Poor

TABLE 2

| | Powdery carbon material | | | VDF polymer | | | Fluorine-free vinyl polymer | | | Solvent N-methyl-2-pyrrolidone:isopropyl alcohol [parts by mass] |
|---|---|---|---|---|---|---|---|---|---|---|
| | | Amount (Parts by mass) | Ratio (Mass %) | (Mw) | Amount (Parts by mass) | Ratio (Mass %) | | Amount (Parts by mass) | Ratio (Mass %) | |
| Ex. 13-1 | Acetylene black HS-100 | 20 | 20.0 | Acid-modified PVDF powder | 80 | 79.9 | PVP (K-30) | 0.1 | 0.10 | 84:16 |
| Ex. 13-2 | black HS-100 | 40 | 40.0 | PVDF powder | 60 | 59.9 | | 0.1 | 0.10 | 84:16 |

TABLE 2-continued

| | | | | | | | | | | | |
|---|---|---|---|---|---|---|---|---|---|---|---|
| Comp. Ex. 13-1 | Acetylene black HS-100 | 10 | 10.0 | (6.7 × 10⁵) Acid-modified PVDF powder | 90 | 89.9 | PVP (K-30) | 0.1 | 0.10 | | 85:15 |
| Comp. Ex. 13-2 | | 70 | 66.7 | (6.7 × 10⁵) | 30 | 28.6 | | 0.1 | 4.76 | | 84:16 |
| Comp. Ex. 13-3 | | 90 | 85.7 | | 10 | 9.5 | | 5.0 | 4.76 | | 84:16 |

| | Basis weight of coating layer | Dispersibility*) | Viscosity [mPa · s] | Adhesion | | | Ra × 20 | Internal resistance [mΩ] |
|---|---|---|---|---|---|---|---|---|
| | | | | Cellophane tape | Dry cotton swab | Conclusion | | |
| Ex. 13-1 | 0.36 | AA | 86 | AA | AA | AA | 0.53 | 306 |
| Ex. 13-2 | 0.37 | AA | 81 | AA | AA | AA | 0.51 | 311 |
| Comp. Ex. 13-1 | 0.32 | AA | | AA | AA | AA | 0.59 | 852 |
| Comp. Ex. 13-2 | 0.34 | AA | | CC | CC | CC | 0.53 | — |
| Comp. Ex. 13-3 | — | CC | | — | — | — | — | — |

*)Evaluation of Dispersibility—AA: Good, CC: Poor

The invention claimed is:

1. A current collector for electrical storage device comprising a sheet-shaped conductive substrate and a coating layer disposed on one or both sides of the conductive substrate, wherein
the coating layer comprises a powdery carbon material, acid-modified polyvinylidene fluoride and polyvinylpyrrolidone,
the content of the polyvinylpyrrolidone in the coating layer is 0.099 to 5.0 mass %, and
the content of the powdery carbon material in the coating layer is 15.0 to 45.0 mass %.

2. The current collector for electrical storage device according to claim 1, wherein the surface roughness Ra of the coating layer is not more than 1.0 μm.

3. The current collector for electrical storage device according to claim 1, wherein the average particle size of primary particles of the powdery carbon material in the coating layer is 10 to 100 nm.

4. The current collector for electrical storage device according to claim 1, wherein the basis weight of the coating layer per side of the conductive substrate is 0.1 to 5.0 g/m².

5. A coating liquid for producing a current collector for electrical storage device, comprising a powdery carbon material, acid-modified polyvinylidene fluoride, polyvinylpyrrolidone and a solvent,
the total content of the powdery carbon material, the acid-modified polyvinylidene fluoride and the polyvinylpyrrolidone being 2 to 20 mass % of the coating liquid,
the ratio of the powdery carbon material to the acid-modified polyvinylidene fluoride (mass of powdery carbon material:mass of acid-modified polyvinylidene fluoride) being 20:80 to 40:60,
the content of the polyvinylpyrrolidone being 0.099 to 5.0 parts by mass per 100 parts by mass of the total of the powdery carbon material and the acid-modified polyvinylidene fluoride,
the solvent comprising N-methyl-2-pyrrolidone.

6. The coating liquid according to claim 5, wherein the solvent further comprises a $C_{1-6}$ alkyl alcohol.

7. The coating liquid according to claim 6, which consists solely of the powdery carbon material, the acid-modified polyvinylidene fluoride, the polyvinylpyrrolidone, the alkyl alcohol and N-methyl-2-pyrrolidone.

8. The coating liquid according to claim 5, wherein the average particle size of primary particles of the powdery carbon material is 10 to 100 nm.

9. The coating liquid according to claim 5, wherein the BET specific surface area of the powdery carbon material is not more than 100 m²/g.

10. The coating liquid according to claim 5, wherein the powdery carbon material is carbon black, and the carbon black has an electric resistivity of not more than $3 \times 10^{-1}$ Ω·cm as measured with respect to a 100%-pressed powder compact in accordance with JIS K 1469: 2003.

11. The coating liquid according to claim 5, wherein the acid-modified polyvinylidene fluoride has a weight average molecular weight of $2.0 \times 10^5$ to $1.4 \times 10^6$, and the polyvinylpyrrolidone has a weight average molecular weight of $5.0 \times 10^3$ to $1.4 \times 10^6$.

12. A method for producing a current collector for electrical storage device, comprising:
a step of preparing a coating liquid comprising a powdery carbon material, acid-modified polyvinylidene fluoride, polyvinylpyrrolidone and a solvent,
a step of applying the coating liquid to one or both sides of a sheet-shaped conductive substrate, and
a step of drying the coating liquid applied,
the total content of the powdery carbon material, the acid-modified polyvinylidene fluoride and the polyvinylpyrrolidone being 2 to 20 mass % of the coating liquid,
the ratio of the powdery carbon material to the acid-modified polyvinylidene fluoride (mass of powdery carbon material:mass of acid-modified polyvinylidene fluoride) being 20:80 to 40:60,
the content of the polyvinylpyrrolidone being 0.099 to 5.0 parts by mass per 100 parts by mass of the total of the powdery carbon material and the acid-modified polyvinylidene fluoride,
the solvent comprising N-methyl-2-pyrrolidone.

13. The production method according to claim 12, wherein the step of applying the coating liquid is a gravure coating step.

* * * * *